US012403703B2

(12) United States Patent
Nakano et al.

(10) Patent No.: US 12,403,703 B2
(45) Date of Patent: Sep. 2, 2025

(54) IMAGE RECORDING APPARATUS, COMPUTER-READABLE STORAGE MEDIUM, AND METHOD FOR APPROPRIATELY ENLARGING IMAGE IN BORDERLESS IMAGE RECORDING

(71) Applicant: BROTHER KOGYO KABUSHIKI KAISHA, Nagoya (JP)

(72) Inventors: Yasuhiro Nakano, Nagoya (JP); Satoru Arakane, Nagoya (JP); Masashi Ohhashi, Kasugai (JP); Koichi Tsugimura, Nagoya (JP); Naoyuki Nakamura, Nagoya (JP); Haruka Azechi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 156 days.

(21) Appl. No.: 18/518,245

(22) Filed: Nov. 22, 2023

(65) Prior Publication Data

US 2024/0208247 A1 Jun. 27, 2024

(30) Foreign Application Priority Data

Dec. 23, 2022 (JP) ................................. 2022-206281

(51) Int. Cl.
*B41J 11/00* (2006.01)

(52) U.S. Cl.
CPC .......... *B41J 11/0065* (2013.01); *B41J 11/007* (2013.01); *B41J 11/008* (2013.01); *B41J 11/0095* (2013.01)

(58) Field of Classification Search
CPC ..... B41J 11/0065; B41J 11/007; B41J 11/008; B41J 11/0095
See application file for complete search history.

(56) References Cited

U.S. PATENT DOCUMENTS

2005/0219300 A1* 10/2005 Fujita .................. B41J 11/0065 347/16
2006/0197964 A1 9/2006 Kasuga
2006/0197983 A1* 9/2006 Hatanaka ............ B41J 11/0065 358/1.18

(Continued)

FOREIGN PATENT DOCUMENTS

JP 2006-244027 A 9/2006
JP 2020-140396 A 9/2020

*Primary Examiner* — Henok D Legesse
(74) *Attorney, Agent, or Firm* — Baker Botts L.L.P.

(57) ABSTRACT

An image recording apparatus includes a controller configured to control a conveyor and an image recording engine to perform borderless image recording. To perform the borderless image recording, the controller performs, when a medium length is equal to or less than a particular length, a first enlargement process to enlarge an image to a size with a first overhang area by which the enlarged image extends beyond an image recording target area, the first overhang area having an overhang width of a first value. The controller further performs, when the medium length is not equal to or less than the particular length, a second enlargement process to enlarge the image to a size with a second overhang area by which the enlarged image extends beyond the image recording target area, the second overhang area having an overhang width of a second value smaller than the first value.

9 Claims, 7 Drawing Sheets

(56) References Cited

U.S. PATENT DOCUMENTS

| | | | | |
|---|---|---|---|---|
| 2006/0232621 | A1* | 10/2006 | Hayamizu ............ | B41J 11/0065 347/19 |
| 2008/0225314 | A1* | 9/2008 | Fukasawa ............ | B41J 11/0065 358/1.9 |
| 2012/0147079 | A1* | 6/2012 | Kobayashi ............. | B41J 29/393 347/16 |
| 2020/0272384 | A1 | 8/2020 | Sawada | |

* cited by examiner

IMAGE RECORDING APPARATUS, COMPUTER-READABLE STORAGE MEDIUM, AND METHOD FOR APPROPRIATELY ENLARGING IMAGE IN BORDERLESS IMAGE RECORDING

REFERENCE TO RELATED APPLICATIONS

This application claims priority from Japanese Patent Application No. 2022-206281 filed on Dec. 23, 2022. The entire content of the priority application is incorporated herein by reference.

BACKGROUND ART

A printing system has been known that is configured to perform borderless printing (i.e., borderless image recording) using a roll sheet (i.e., a medium). The printing system includes an element configured to identify a width of the roll sheet to be used, an element configured to calculate a sheet size for borderless printing from the width of the roll sheet and an aspect ratio of an input image, and an element configured to enlarge and reduce the input image according to the width size of the roll sheet.

DESCRIPTION

In the known printing system, the image is enlarged according to the width of the medium in the borderless image recording. However, if the image is enlarged according to the width of the medium regardless of a length (i.e., a medium length) of the medium in a conveyance direction in which the medium is conveyed, it may cause the following problems.

Suppose for instance that respective images on a first medium and a second medium having a same width as the first medium and a longer medium length than the first medium are enlarged at a same enlargement ratio (e.g., in such a manner that a width of an overhang area by which each of the enlarged images extends beyond an image recording target area becomes 0.5 mm). In this case, on the first medium having a shorter medium length than the second medium, the image is enlarged by a smaller amount in the conveyance direction. Therefore, due to a conveyance error, an unwanted margin may be generated at an edge portion of the image recording target area on the first medium.

Suppose for instance that respective images on a third medium and a fourth medium having a same width as the third medium and a longer medium length than the third medium are enlarged at a same enlargement ratio (e.g., in such a manner that a width of an overhang area by which each of the enlarged images extends beyond an image recording target area becomes 2.5 mm). In this case, on the fourth medium having a longer medium length than the third medium, the image is enlarged by a larger amount in the conveyance direction. This may cause, on the fourth medium, an excessive size of the overhang area in the conveyance direction and a large missing part of the image.

Aspects of the present disclosure are advantageous for providing one or more improved techniques for an image recording apparatus that make it possible to appropriately enlarge an image in borderless image recording, thereby suppressing generation of an unwanted margin or a missing part of the image.

According to aspects of the present disclosure, an image recording apparatus is provided, which includes a conveyor, an image recording engine, and a controller. The conveyor is configured to convey an image recording medium in a conveyance direction. The image recording engine is configured to record an image on the image recording medium. The controller is configured to determine whether a medium length of the image recording medium in the conveyance direction is equal to or less than a particular length. The controller is further configured to perform, in response to determining that the medium length is equal to or less than the particular length, a first enlargement process to enlarge the image to a size with a first overhang area by which the enlarged image extends beyond an image recording target area. The first overhang area has an overhang width of a first value in an orthogonal direction that is orthogonal to the conveyance direction. The controller is further configured to perform, in response to determining that the medium length is not equal to or less than the particular length, a second enlargement process to enlarge the image to a size with a second overhang area by which the enlarged image extends beyond the image recording target area. The second overhang area has an overhang width of a second value in the orthogonal direction. The second value is smaller than the first value. The controller is further configured to perform an image recording process to control the conveyor and the image recording engine to record, in the image recording target area on the image recording medium, the enlarged image resulting from one of the first enlargement process and the second enlargement process, thereby performing borderless image recording in which there is no margin at a periphery portion of the image recording target area.

According to aspects of the present disclosure, further provided is a non-transitory computer-readable storage medium storing computer-readable instructions that are executable by a processor of an image recording apparatus. The image recording apparatus includes a conveyor and an image recording engine. The conveyor is configured to convey an image recording medium in a conveyance direction. The image recording engine is configured to record an image on the image recording medium. The instructions are configured to, when executed by the processor, cause the image recording apparatus to determine whether a medium length of the image recording medium in the conveyance direction is equal to or less than a particular length. The instructions are further configured to, when executed by the processor, cause the image recording apparatus to perform, in response to determining that the medium length is equal to or less than the particular length, a first enlargement process to enlarge the image to a size with a first overhang area by which the enlarged image extends beyond an image recording target area. The first overhang area has an overhang width of a first value in an orthogonal direction that is orthogonal to the conveyance direction. The instructions are further configured to, when executed by the processor, cause the image recording apparatus to perform, in response to determining that the medium length is not equal to or less than the particular length, a second enlargement process to enlarge the image to a size with a second overhang area by which the enlarged image extends beyond the image recording target area. The second overhang area has an overhang width of a second value in the orthogonal direction. The second value is smaller than the first value. The instructions are further configured to, when executed by the processor, cause the image recording apparatus to perform an image recording process to control the conveyor and the image recording engine to record, in the image recording target area on the image recording medium, the enlarged image resulting from one of the first enlargement process and the second enlargement process, thereby performing borderless image recording in which there is no margin at a periphery portion of the image recording target area.

According to aspects of the present disclosure, further provided is a method implementable on a controller of an image recording apparatus. The image recording apparatus includes a conveyor and an image recording engine. The conveyor is configured to convey an image recording medium in a conveyance direction. The image recording engine is configured to record an image on the image recording medium. The method includes determining whether a medium length of the image recording medium in the conveyance direction is equal to or less than a particular length. The method further includes performing, in response to determining that the medium length is equal to or less than the particular length, a first enlargement process to enlarge the image to a size with a first overhang area by which the enlarged image extends beyond an image recording target area. The first overhang area has an overhang width of a first value in an orthogonal direction that is orthogonal to the conveyance direction. The method further includes performing, in response to determining that the medium length is not equal to or less than the particular length, a second enlargement process to enlarge the image to a size with a second overhang area by which the enlarged image extends beyond the image recording target area. The second overhang area has an overhang width of a second value in the orthogonal direction. The second value is smaller than the first value. The method further includes performing an image recording process to control the conveyor and the image recording engine to record, in the image recording target area on the image recording medium, the enlarged image resulting from one of the first enlargement process and the second enlargement process, thereby performing borderless image recording in which there is no margin at a periphery portion of the image recording target area.

Figure 1:
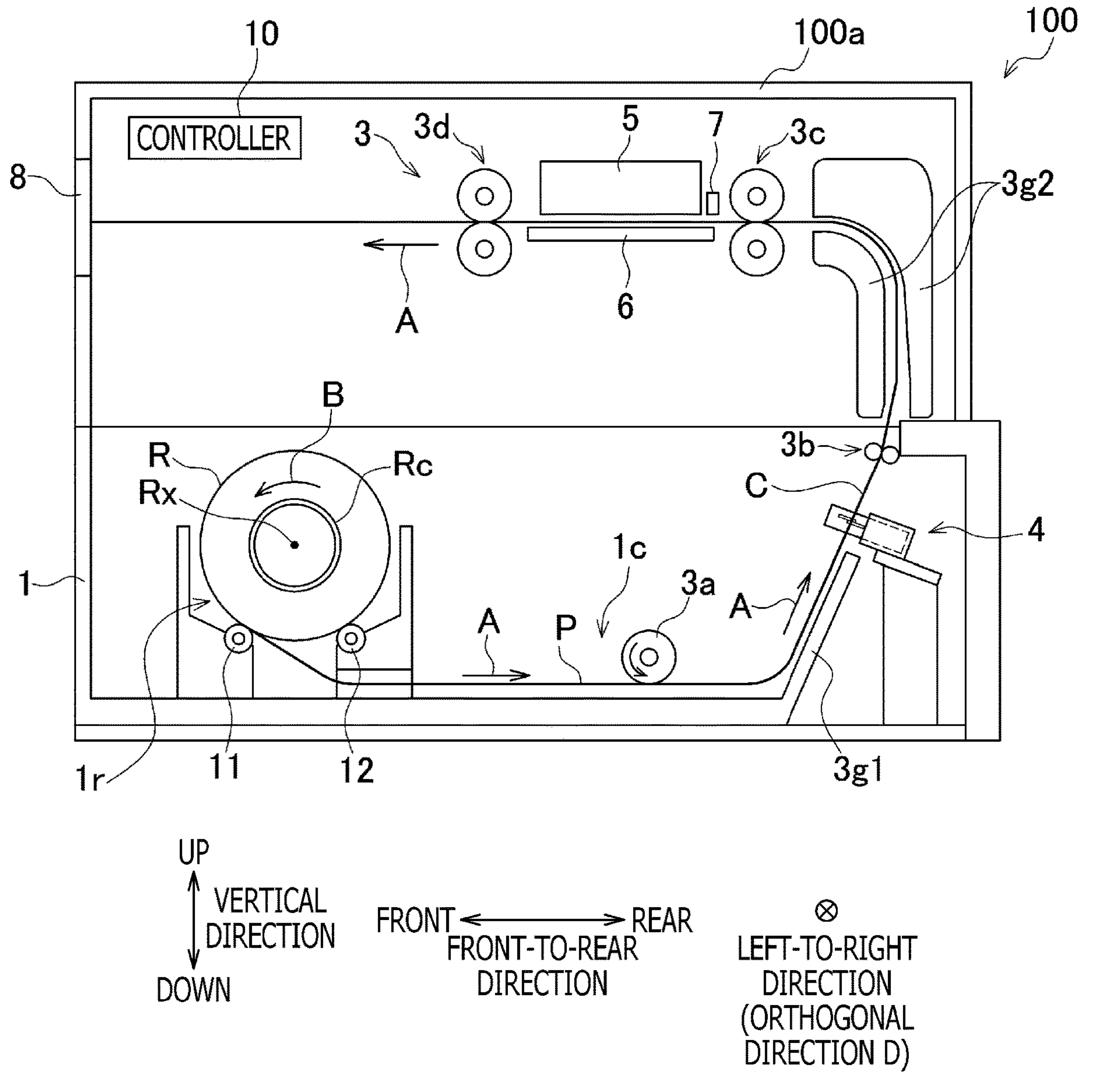
FIG. 1 is a cross-sectional side view schematically showing a configuration of a printer.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

FIRST ILLUSTRATIVE EMBODIMENT

First, an overall configuration of a printer 100 in a first illustrative embodiment according to aspects of the present disclosure will be described with reference to FIGS. 1 and 2. In the following description, a vertical direction, a front-to-rear direction, and a left-to-right direction shown in FIGS. 1 and 2 will be defined as a front-to-rear direction, and a left-to-right direction of the printer 100, respectively. The vertical direction, the front-to-rear direction, and the left-to-right direction are orthogonal to each other. It is noted that hereinafter, each of the above directions may represent two mutually-opposite directions along each individual direction. Specifically, for instance, the vertical direction may represent both the upward direction and the downward direction that are along the vertical direction. Further, the front-to-rear direction may represent both the frontward direction and the rearward direction that are along the front-to-rear direction. Moreover, the left-to-right direction may represent both the leftward direction and the rightward direction that are along the left-to-right direction.

The printer 100 includes a housing 100*a*, a feed tray 1, a conveyor 3, a cutter 4, a head 5, a platen 6, a sheet sensor 7, a discharge tray 8, and a controller 10.

The discharge tray 8 includes an upper front side wall of the housing 100*a*. The discharge tray 8 is configured in such a manner that the upper front side wall is open or closed with respect to the housing 100*a*.

The feed tray 1 is formed in an upward-opening box shape. The feed tray 1 is configured to be removably attached to a lower portion of the housing 100*a*. Specifically, the feed tray 1 is configured to move forward relative to the housing 100*a* along the front-to-rear direction, thereby being pulled out of the housing 100*a*. Further, the feed tray 1 is configured to move backward relative to the housing 100*a* along the front-to-rear direction, thereby being attached to the housing 100*a*.

The feed tray 1 has a roll sheet storage 1*r* and a cut sheet storage 1*c*. The roll sheet storage 1*r* is configured to accommodate a roll sheet R (see FIG. 1). The cut sheet storage 1*c* is configured to accommodate a cut sheet Pc (see FIG. 2).

The roll sheet R (see FIG. 1) is a long sheet P wound in a roll shape around an outer circumference of a cylindrical core member Rc. The roll sheet R is stored in the roll sheet storage 1*r* with its rotational axis Rx (i.e., a central axis of the core member Rc) along the left-to-right direction. The roll sheet R is supported by two rollers 11 and 12.

The cut sheet Pc (see FIG. 2) is a sheet P of which a length in a conveyance direction A is shorter than the sheet of the roll sheet R and longer than a length from a feed roller 3*a* to intermediate rollers 3*b* along a conveyance path C. The cut sheet storage 1*c* has a space positioned rearward of the roll sheet storage 1*r* in the feed tray 1. The cut sheet storage 1*c* is configured to accommodate a plurality of cut sheets Pc stacked in the vertical direction.

In the printer 100, the cut sheets Pc are removed from the cut sheet storage 1*c* when the roll sheet R is used (see FIG. 1). Meanwhile, the roll sheet R is removed from the roll sheet storage 1*r* when the cut sheets Pc are used (see FIG. 2).

The conveyor 3 includes a pick-up roller 3*a*, intermediate rollers 3*b*, conveyance rollers 3*c*, discharge rollers 3*d*, and guides 3*g*1 and 3*g*2. The conveyor 3 is configured to convey a sheet P from one of the roll sheet storage 1*r* and the cut sheet storage 1*c* in the conveyance direction A along the conveyance path C that extends from the storage sections 1*r* and 1*c*, passing under the head 5, to the discharge tray 8.

The pick-up roller 3*a* is disposed above the cut sheet storage 1*c*. The pick-up roller 3*a* is urged to approach a bottom (i.e., an upward-facing surface) of the feed tray 1. The pick-up roller 3*a* is a driving roller that is driven to rotate by a driving force from a conveyance motor 3*m* (see FIG. 3). The intermediate rollers 3*b* include a driving roller that is driven to rotate by a driving force from the conveyance motor 3*m*, and a driven roller that is configured to rotate according to the rotation of the driving roller. Likewise, the conveyance rollers 3*c* include a driving roller that is driven to rotate by a driving force from the conveyance motor 3*m*, and a driven roller that is configured to rotate according to the rotation of the driving roller. In addition, likewise, the discharge rollers 3*d* include a driving roller that is driven to rotate by a driving force from the conveyance motor 3*m*, and a driven roller that is configured to rotate according to the rotation of the driving roller.

As shown in FIG. 1, when the controller 10 drives the conveyance motor 3*m* (see FIG. 3) to rotate the pick-up roller 3*a* in a state where the roll sheet R is stored in the roll sheet storage 1*r*, the roll sheet R rotates in a rotational direction B (see an arrow B in FIG. 1), and a sheet P unwound from the roll sheet R is fed toward the intermediate rollers 3*b*. Then, the intermediate rollers 3*b*, the conveyance rollers 3*c*, and the discharge rollers 3*d* rotate while holding the sheet P therebetween, thereby conveying the sheet P in the conveyance direction A along the conveyance path C.

Figure 2:
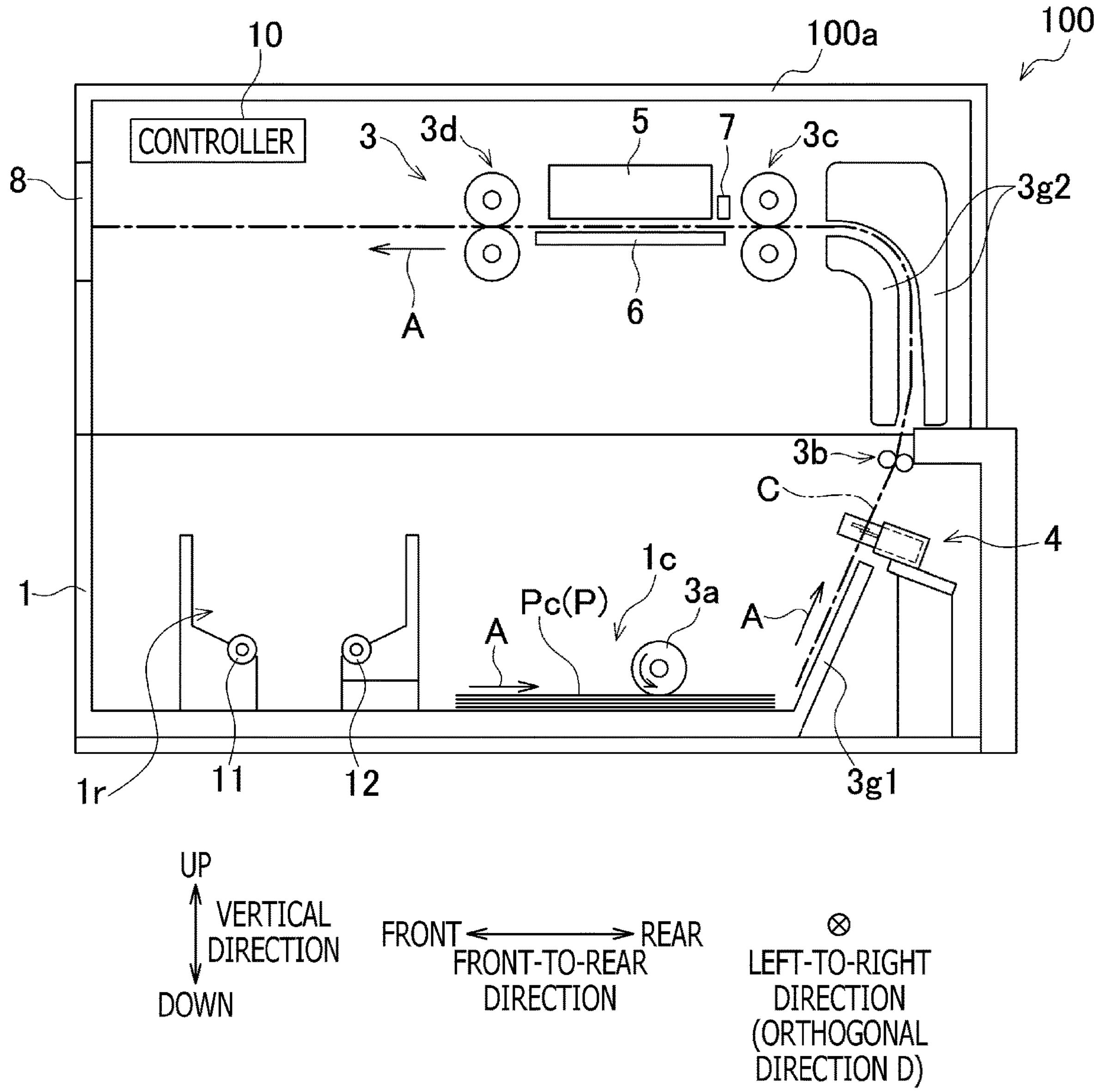
FIG. 2 is a cross-sectional side view showing a state of the printer in which a roll sheet is removed from a feed tray and cut sheets are set in the feed tray.

As shown in FIG. 2, when the controller 10 drives the conveyance motor 3*m* (see FIG. 3) to rotate the pick-up roller 3*a* in a state where the cut sheets Pc are stored in the cut sheet storage 1*c*, a top one of the plurality of cut sheets Pc stored in the cut sheet storage 1*c* is conveyed in the conveyance direction A along the conveyance path C.

The guide 3*g*1 is disposed between the pick-up roller 3*a* and the intermediate rollers 3*b* in the conveyance direction A along the conveyance path C. The guide 3*g*1 is configured to guide the sheet P fed by the pick-up roller 3*a* to the intermediate rollers 3*b*. The guide 3*g*1 is formed by a side wall of the feed tray 1.

The guide 3*g*2 is disposed between the intermediate rollers 3*b* and the conveyance rollers 3*c* in the conveyance direction A along the conveyance path C. The guide 3*g*2 is configured to guide the sheet P conveyed by the intermediate rollers 3*b* to the conveyance rollers 3*c*. The guide 3*g*2 includes two plate-shaped members disposed to sandwich the conveyance path C therebetween.

The cutter 4 includes two rotary blades disposed to sandwich the conveyance path C therebetween. When the controller 10 drives a cutter motor 4*m* (see FIG. 3) to rotate the two rotary blades, the sheet P unwound from the roll sheet R is cut along the left-to-right direction.

The head 5 is disposed between the conveyance rollers 3*c* and the discharge rollers 3*d* in the conveyance direction A along the conveyance path C. The head 5 includes a plurality of nozzles formed on a lower surface thereof, and a driver IC 5*m* (see FIG. 3). In response to the driver IC 5*m* (see FIG. 3) being driven by the controller 10 when the sheet P conveyed by the conveyor 3 passes under the head 5 while being supported by the platen 6, ink is ejected from the nozzles, and an image is recorded on the sheet P. The head 5 may be either of a line type to eject ink from the nozzles in a fixed position or of a serial type to eject ink from the nozzles while moving along the left-to-right direction.

The platen 6 is disposed below the head 5 and between the conveyance rollers 3*c* and the discharge rollers 3*d* in the conveyance direction A along the conveyance path C.

The sheet sensor 7 is disposed between the conveyance rollers 3*c* and the head 5 in the conveyance direction A along the conveyance path C. For instance, the sheet sensor 7 is an optical sensor. The sheet sensor 7 is configured to send a detection signal to the controller 10 in response to detecting the sheet P.

Figure 3:
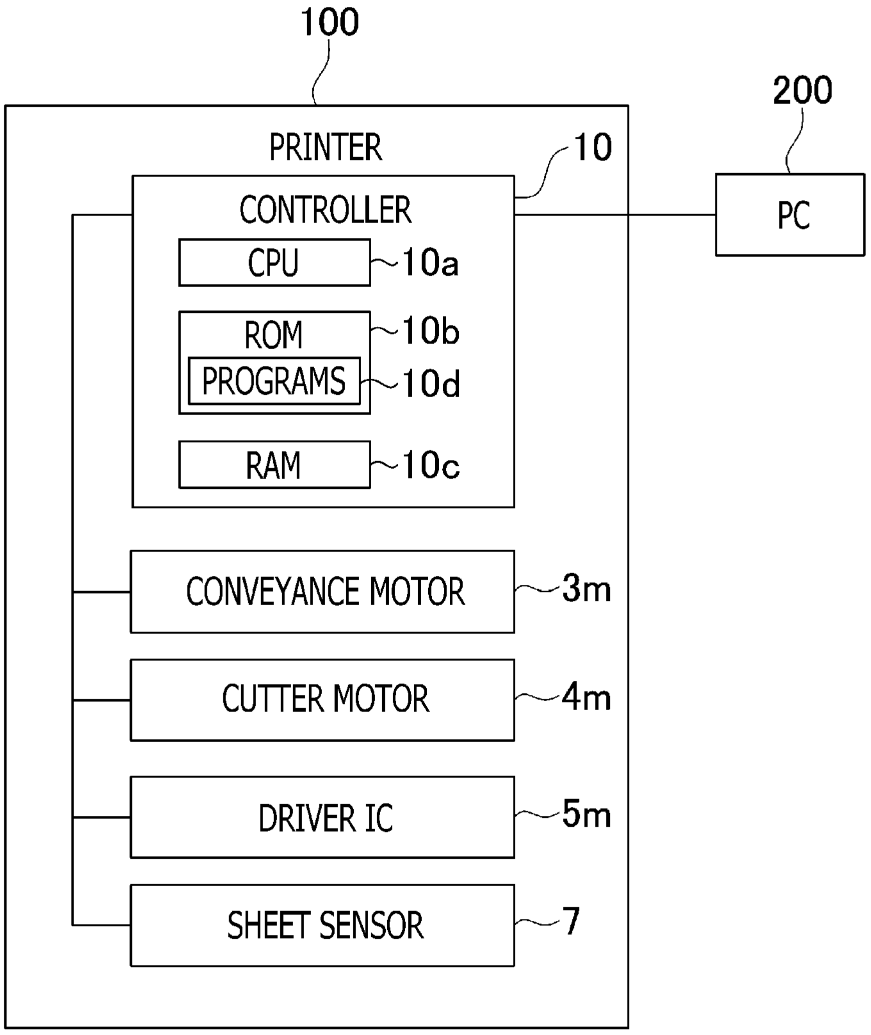
FIG. 3 is a block diagram showing an electrical configuration of the printer.

As shown in FIG. 3, the controller 10 includes a CPU ("CPU" is an abbreviation for "Central Processing Unit") 10*a*, a ROM ("ROM" is an abbreviation for "Read Only Memory") 10*b*, and a RAM ("RAN" is an abbreviation for "Random Access Memory") 10*c*. The ROM 10*b* stores programs 10*d* and data for the CPU 10*a* to control various operations. The RAM 10*c* is configured to temporarily store data used by the CPU 10*a* to execute the programs 10*d*. The CPU 10*a* is configured to perform an image recording process in accordance with the programs 10*d* and the data stored in the ROM 10*b* and the RAM 10*c*, based on an image recording instruction (including image data) received from an external device such as a PC 200 or an external memory connected with the printer 100.

In the image recording process, the CPU 10*a* controls the conveyance motor 3*m*, the cutter motor 4*m*, and the driver IC 5*m*. At this time, when the roll sheet R is used in the image recording process, the sheet P unwound from the roll sheet R is conveyed in the conveyance direction A by the conveyor 3 and cut to a particular length by the cutter 4, and an image is recorded on the sheet P by ink being ejected from the nozzles of the head 5. Meanwhile, when the cut sheet Pc is used (as the sheet P) in the image recording process, the cut sheet Pc is conveyed by the conveyor 3 in the conveyance direction A without being cut by the cutter 4, and the image is recorded on the cut sheet Pc by ink being ejected from the nozzles of the head 5. The sheet P with the image recorded thereon is discharged onto the discharge tray 8 that is open with respect to the housing 100*a*.

The CPU 10*a* is configured to selectively perform "borderless image recording" or "bordered image recording." The "borderless image recording" is image recording in which there is no margin at a periphery portion of an image recording target area X on the sheet P. The "bordered image recording" is image recording in which there is a margin at the periphery portion of the image recording target area X on the sheet P.

When the cut sheet Pc (i.e., the sheet P that is not cut by the cutter 4) is used in the image recording process, the image recording target area X is an entire area on the sheet P. Meanwhile, when the roll sheet R (more specifically, the sheet P that is unwound from the roll sheet R and cut by the cutter 4) is used in the image recording process, the image recording target area X is an area on the cut sheet P. Further, for instance, when it is assumed that the user manually cuts the sheet P discharged on the discharge tray 8, the image recording target area X may be an area on the sheet P cut by the user. The "cutting" may be either cutting along the left-to-right direction for adjusting a length of the sheet P in the conveyance direction A or cutting along the conveyance direction A for adjusting a length of the sheet P in the left-to-right direction. The left-to-right direction is orthogonal to the conveyance direction A. Hereinafter, the left-to-right direction may be referred to as an "orthogonal direction D."

Next, the borderless image recording will be described with reference to FIGS. 4 to 7. The borderless image recording shown in FIG. 4 may be performed by the CPU 10*a* executing the programs 10*d* stored in the ROM 10*b*.

Figure 4:
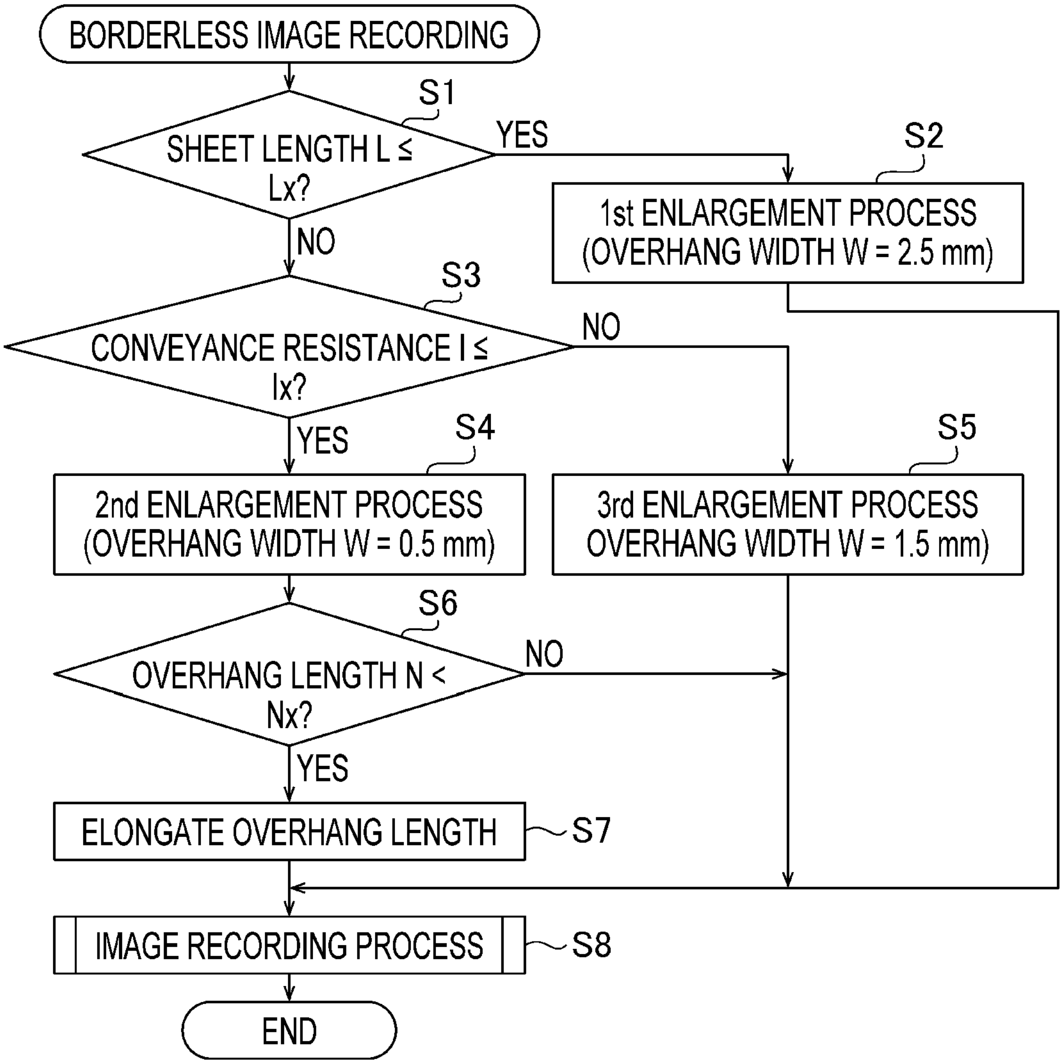
FIG. 4 is a flowchart showing a procedure of borderless image recording to be performed by a CPU of the printer.

As shown in FIG. 4, in the borderless image recording, the CPU 10*a* first determines whether a sheet length L is equal to or less than a particular length Lx (S1). The sheet length L is a length of the sheet P in the conveyance direction A (see FIGS. 6 and 7). When the roll sheet R is used, the sheet length L is a length, in the conveyance direction A, of the sheet P that has been unwound from the roll sheet R and cut by the cutter 4.

In response to determining that the sheet length L is equal to or less than the particular length Lx (S1: Yes), the CPU 10*a* performs an after-mentioned first enlargement process (S2).

In response to determining that the sheet length L is not equal to or less than the particular length Lx (S1: No), the CPU 10*a* determines whether a conveyance resistance I is equal to or less than a particular resistance value Ix (S3).

The conveyance resistance I is a resistance of the sheet P to being conveyed by the conveyor 3. The conveyance resistance I is determined by various factors such as a type of the sheet P, a fiber orientation of the sheet P, and a configuration of the conveyor 3. A relationship between the conveyance resistance I and the type of the sheet P is as follows. For instance, as the sheet P is a glossy sheet or a harder sheet, the conveyance resistance I becomes greater. A relationship between the conveyance resistance I and the fiber orientation of the sheet P is as follows. In the case of a transverse grain in which the fiber orientation of the sheet P is parallel to the orthogonal direction D, the conveyance resistance I becomes greater than the case of a longitudinal grain in which the fiber orientation of the sheet P is parallel to the conveyance direction A. A relationship between the conveyance resistance I and the configuration of the conveyor 3 is as follows. For instance, as the guides 3*g*1 and 3*g*2 included in the conveyor 3 have larger surface roughness, the conveyance resistance I becomes greater.

Under a condition that the driving force from the conveyance motor 3*m* is constant, the greater the conveyance resistance I is, the smaller a conveyance amount becomes. As a result, an undesired margin or blank space is more easily generated at a trailing end portion (i.e., an upstream end portion in the conveyance direction A) of the sheet P.

In response to determining that the conveyance resistance I is equal to or less than the particular resistance value Ix (S3: Yes), the CPU 10*a* performs an after-mentioned second enlargement process (S4).

In response to determining that the conveyance resistance I is not equal to or less than the particular resistance value Ix (S3: No), the CPU 10*a* performs an after-mentioned third enlargement process (S5).

The first to third enlargement processes are processes to enlarge an image to a size with an overhang area Y by which the enlarged image extends beyond the image recording target area X. For instance, the first to third enlargement processes are for enlarging the image from a size of the image recording target area X surrounded by solid lines in FIG. 6 or 7 to a size of the overhang area Y added to the image recording target area X that is surrounded by a dashed line in the same figure.

Figure 6:
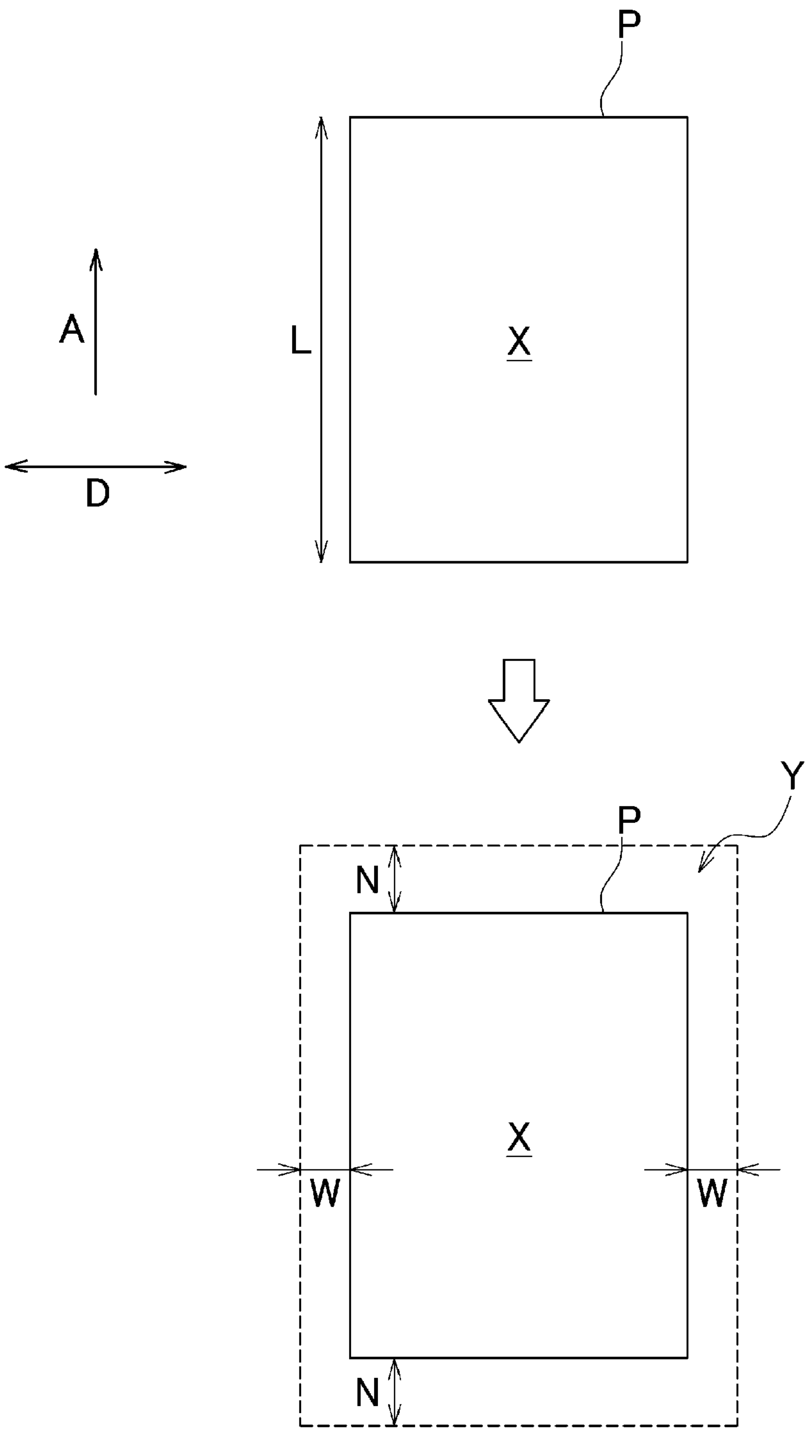
FIG. 6 illustrates an enlargement process for a sheet that is relatively short in a conveyance direction.

The first enlargement process is a process to set a length (i.e., an overhang width W) of the overhang area Y in the orthogonal direction D to 2.5 mm (see FIG. 6).

Figure 7:
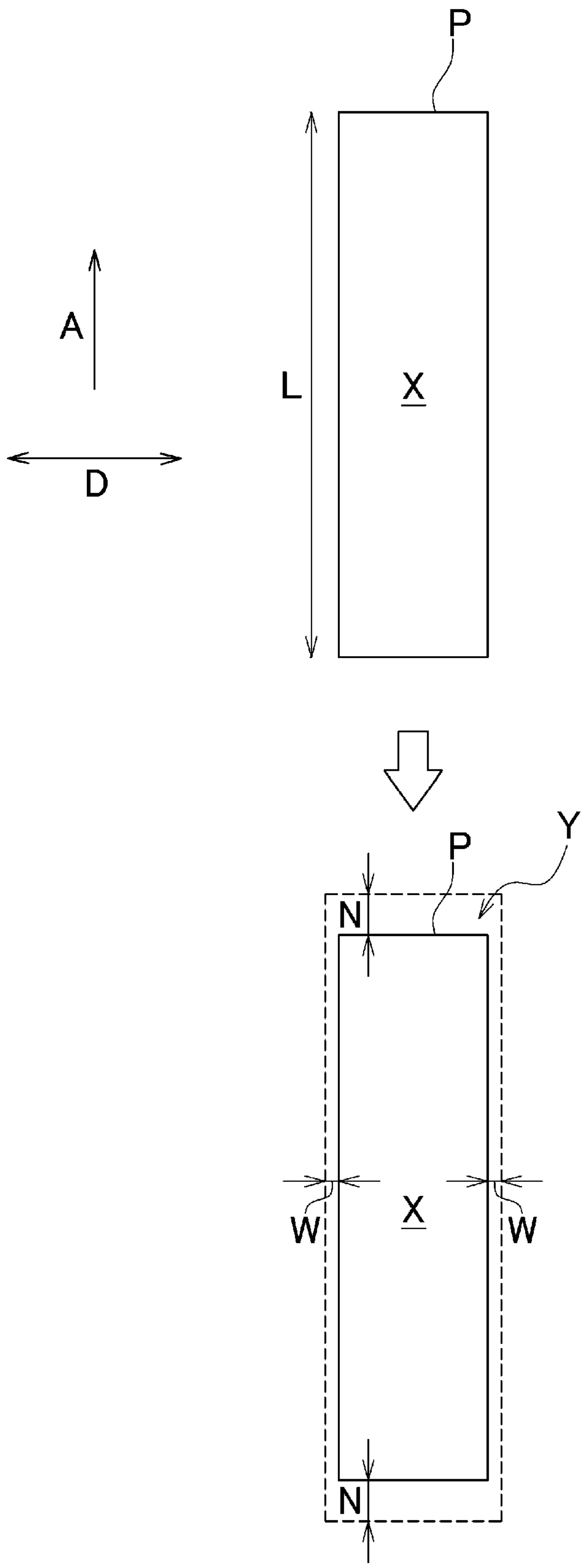
FIG. 7 illustrates an enlargement process for a sheet that is relatively long in the conveyance direction.

The second enlargement process is a process to set the length (i.e., the overhang width W) of the overhang area Y in the orthogonal direction D to 0.5 mm (see FIG. 7).

The third enlargement process is a process to set the length (i.e., the overhang width W) of the overhang area Y in the orthogonal direction D to 1.5 mm.

In each of the first to third enlargement processes, the CPU 10*a* enlarges the image at a same enlargement ratio in the conveyance direction A and the orthogonal direction D, to set a length (i.e., an overhang length N) of the overhang area Y in the conveyance direction A to be greater than the overhang width W. For instance, in the second enlargement process, the CPU 10*a* sets the overhang width W to 0.5 mm and sets the overhang length N to 2.5 mm.

After S4, the CPU 10*a* determines whether the overhang length N is less than a threshold value Nx (S6). The threshold value Nx is a value set in consideration of a conveyance error. If the overhang length N is less than the threshold value Nx, a blank space may be generated at the trailing end portion of the sheet P due to the conveyance error.

In response to determining that the overhang length N is less than the threshold value Nx (S6: Yes), the CPU 10*a* increases the overhang length N from the initial value (e.g., 2.5 mm) by elongating an image forming the overhang area Y in the conveyance direction A (S7). For instance, the CPU 10*a* elongates the image in the conveyance direction A by repeating a pattern of the image recorded at the trailing end portion of the sheet P.

After S2, S5, or S7, or in response to determining that the overhang length N is not less than the threshold value Nx (S6: No), the CPU 10*a* performs an image recording process (S8). Thereafter, the CPU 10*a* terminates the borderless image recording shown in FIG. 4. In the image recording process (S8), the CPU 10*a* controls the conveyance motor 3*m* and the driver IC 5*m* to record, in the image recording target area X, the image enlarged in the applied one of the enlargement processes.

Figure 5:
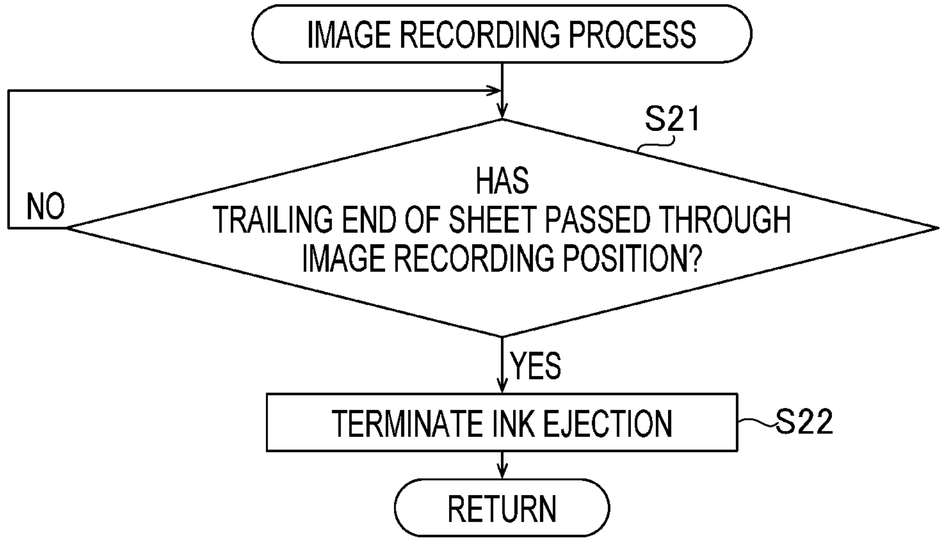
FIG. 5 is a flowchart showing a procedure of an image recording process in the borderless image recording shown in FIG. 4.

In the image recording process (S8), as shown in FIG. 5, the CPU 10*a* determines whether the trailing end of the sheet P has passed through an image recording position of the head 5 (S21). The CPU 10*a* makes the determination in S21 based on the detection signal received from the sheet sensor 7 (see FIGS. 1 to 3). The image recording position corresponds to an area where the nozzles are provided in the head 5.

In response to determining that the trailing end of the sheet P has passed through the image recording position of the head 5 (S21: Yes), the CPU 10*a* terminates the ejection of ink from the nozzles of the head 5 (i.e., the image recording by the head 5) (S22). Thereafter, the CPU 10*a* terminates the image recording process shown in FIG. 5. The sheet P is conveyed by the conveyor 3 and is discharged onto the discharge tray 8 that is open with respect to the housing 100*a*.

As described above, according to the first illustrative embodiment, in the borderless image recording, when the sheet length L is equal to or less than the particular length Lx (S1: Yes), the CPU 10*a* sets the overhang width W to a relatively-large first value (i.e., 2.5 mm) in the first enlargement process (S2) (see FIG. 6). Thereby, it is possible to suppress generation of a blank space. When the sheet length L is not equal to or less than the particular length Lx (S1: No), the CPU 10*a* sets the overhang width W to a relatively-small second value (i.e., 0.5 mm) in the second enlargement process (S4) (see FIG. 7). Thereby, it is possible to suppress occurrence of a missing part of the image.

Under the condition that the driving force from the conveyance motor 3*m* is constant, the greater the conveyance resistance I is, the smaller the conveyance amount becomes. As a result, a blank space is more easily generated at the trailing end portion of the sheet P. In view of the above, in the first illustrative embodiment, even when the sheet length L is not equal to or less than the particular length Lx (S1: No), the CPU 10*a* does not uniformly perform the second enlargement process (S4) of setting the overhang width W to the relatively-small second value (i.e., 0.5 mm). Specifically, even if the sheet length L is greater than the particular length Lx (S1: No), when the conveyance resistance I is greater than the particular resistance value Ix (S3: No), the CPU 10*a* performs the third enlargement process (S5) to set the overhang width W to a third value (i.e., 1.5 mm) that is greater than the second value. Thereby, it is possible to suppress generation of a blank space.

When the image is enlarged at the same enlargement ratio in the conveyance direction A and the orthogonal direction D, the overhang length N becomes greater than the overhang width W (see FIGS. 6 and 7). In particular, as shown in FIG. 7, as the sheet length L is longer, the overhang length N becomes greater. As the overhang length N increases, the amount of ink ejected onto the platen 6 increases. As a result, the platen 6 becomes dirtier. In addition, a larger amount of ink is consumed unnecessarily. As a solution for the above problems, it is considered to shorten the overhang length N. However, if the overhang length N is shortened, a blank space may be generated due to the conveyance error. Therefore, in the first illustrative embodiment, the overhang length N is made greater than the overhang width W by enlarging the image at the same enlargement ratio in the conveyance direction A and the orthogonal direction D in the second enlargement process (see FIG. 7). In other words, the overhang length N is not shortened to suppress the above problems. Thereby, it is possible to suppress generation of a blank space due to the conveyance error.

If the overhang length N is less than the threshold value Nx, a blank space may be generated due to the conveyance error. Therefore, in the first illustrative embodiment, when the overhang length N is less than the threshold value Nx (S6: Yes), the overhang length N is increased from the initial value (i.e., a fourth value: 2.5 mm) by elongating the image forming the overhang area Y in the conveyance direction A (S7). Thereby, it is possible to suppress generation of a blank space due to the conveyance error.

In a case where image data remains unprocessed at a time when the trailing end of the sheet P has passed the image recording position, if the image recording process is continued based on the remaining image data, ink is ejected onto the platen 6, such that the platen 6 is dirty with the ink. Further, in this case, ink is consumed unnecessarily. In view of the above problems, in the first illustrative embodiment, when the trailing end of the sheet P has passed through the image recording position of the head 5 (S21: Yes), the CPU 10*a* terminates the ejection of ink from the nozzles of the head 5 (i.e., the image recording by the head 5) (S22). Thereby, it is possible to suppress the above problems.

SECOND ILLUSTRATIVE EMBODIMENT

Subsequently, a second illustrative embodiment according to aspects of the present disclosure will be described.

The second illustrative embodiment differs from the aforementioned first illustrative embodiment in the processing of S7 (see FIG. 4) in the borderless image recording performed by the CPU 10*a*, but is otherwise the same as the first illustrative embodiment.

In the aforementioned first illustrative embodiment, in S7, the CPU 10*a* elongates the image forming the overhang area Y in the conveyance direction A, thereby setting the overhang length N to be greater than the initial value (i.e., the fourth value: 2.5 mm). In contrast, in the second illustrative embodiment, the CPU 10*a* sets the overhang length N to be greater than the initial value (i.e., the fourth value: 2.5 mm) by increasing the enlargement ratio for the image. Thereby, it is possible to suppress generation of a blank space due to the conveyance error.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

MODIFICATIONS

In the aforementioned illustrative embodiments, the third value (i.e., the overhang width W=1.5 mm in the third enlargement process in S5) is different from the first value (i.e., the overhang width W=2.5 mm in the first enlargement process in S2). However, the third value may be the same as the first value. In this case, when the conveyance resistance I is not equal to or less than the particular value Ix in FIG. 4 (S3: No), the CPU 10*a* may perform the first enlargement process (S2).

In the aforementioned illustrative embodiments, the fourth value (i.e., the overhang length N=2.5 mm) is the same as the first value (i.e., the overhang width W=2.5 mm in the first enlargement process in S2). However, the fourth value may be different from the first value.

Examples of the image recording medium are not limited to paper, but may include cloth and resin material.

The image recording engine may be configured to perform image recording on the image recording medium by ejecting, onto the image recording medium, liquid (e.g., processing liquid to agglomerate or precipitate components in ink) other than ink. Image recording methods applicable to the image recording engine are not limited to a liquid ejection method, but may include a laser method and a thermal transfer method.

Apparatuses or devices to which aspects of the present disclosure are applicable are not limited to printers, but may include fax machines, copiers, and multi-function peripherals.

The programs according to aspects of the present disclosure may be distributed in a state where they are stored on a removable storage medium (e.g., a flexible disk) or a fixed storage medium (e.g., a hard disk), and may be distributed via a communication network.

The following shows examples of associations between elements illustrated in the aforementioned illustrative embodiment(s) and modification(s), and elements claimed according to aspects of the present disclosure. For instance, the printer 100 may be an example of an "image recording apparatus" according to aspects of the present disclosure. The conveyor 3 may be an example of a "conveyor" according to aspects of the present disclosure. The head 5 may be an example of an "image recording engine" according to aspects of the present disclosure, or may be included in the "image recording engine" according to aspects of the present disclosure. The controller 10 may be an example of a "controller" according to aspects of the present disclosure.

The CPU 10*a* may be an example of a "processor" according to aspects of the present disclosure, and may be included in the "controller" according to aspects of the present disclosure. The ROM 10*b* storing the programs 10*d* may be an example of a "non-transitory computer-readable storage medium storing computer-readable instructions" according to aspects of the present disclosure, and may be included in the "controller" according to aspects of the present disclosure.

What is claimed is:

1. An image recording apparatus comprising:
- a conveyor configured to convey an image recording medium in a conveyance direction;
- an image recording engine configured to record an image on the image recording medium; and
- a controller configured to:
  - determine whether a medium length of the image recording medium in the conveyance direction is equal to or less than a particular length;
  - in response to determining that the medium length is equal to or less than the particular length, perform a first enlargement process to enlarge the image to a size with a first overhang area by which the enlarged image extends beyond an image recording target area, the first overhang area having an overhang width of a first value in an orthogonal direction that is orthogonal to the conveyance direction;
  - in response to determining that the medium length is not equal to or less than the particular length, perform a second enlargement process to enlarge the image to a size with a second overhang area by which the enlarged image extends beyond the image recording target area, the second overhang area having an overhang width of a second value in the orthogonal direction, the second value being smaller than the first value; and
  - perform an image recording process to control the conveyor and the image recording engine to record, in the image recording target area on the image recording medium, the enlarged image resulting from one of the first enlargement process and the second enlargement process, thereby performing borderless image recording in which there is no margin at a periphery portion of the image recording target area.

2. The image recording apparatus according to claim 1, wherein the controller is further configured to:
- in response to determining that the medium length is not equal to or less than the particular length, determine whether a conveyance resistance is equal to or less than a particular resistance value, the conveyance resistance representing a resistance of the image recording medium to being conveyed by the conveyor;
- in response to determining that the conveyance resistance is equal to or less than the particular resistance value, perform the second enlargement process; and
- in response to determining that the conveyance resistance is not equal to or less than the particular resistance value, perform a third enlargement process to enlarge the image to a size with a third overhang area by which the enlarged image extends beyond the image recording target area, the third overhang area having an overhang width of a third value in the orthogonal direction, the third value being greater than the second value.

3. The image recording apparatus according to claim 1, wherein the controller is further configured to, in the second enlargement process, enlarge the image at a same enlargement ratio in the conveyance direction and the orthogonal direction and set an overhang length of the second overhang area in the conveyance direction to be a predetermined value greater than the second value.

4. The image recording apparatus according to claim 3, wherein the controller is further configured to:
- after the second enlargement process, determine whether the overhang length is less than a threshold value, before the image recording process; and
- in response to determining that the overhang length is less than the threshold value, elongate an image forming the second overhang area in the conveyance direction, thereby setting the overhang length to be greater than the predetermined value.

5. The image recording apparatus according to claim 3, wherein the controller is further configured to:
- after the second enlargement process, determine whether the overhang length is less than a threshold value, before the image recording process; and
- in response to determining that the overhang length is less than the threshold value, enlarge the image at an enlargement ratio that is greater than the enlargement ratio in the second enlargement process, thereby setting the overhang length to be greater than the predetermined value.

6. The image recording apparatus according to claim 1, wherein the controller is further configured to, in the image recording process, perform:
- determining whether an upstream end of the image recording medium in the conveyance direction has passed through an image recording position of the image recording engine; and
- in response to determining that the upstream end of the image recording medium in the conveyance direction has passed through the image recording position, terminating image recording by the image recording engine.

7. The image recording apparatus according to claim 1, wherein the controller comprises:
- a processor; and
- a non-transitory computer-readable storage medium storing computer-readable instructions configured to, when executed by the processor, cause the controller to control the conveyor and the image recording engine to perform the borderless image recording.

8. A non-transitory computer-readable storage medium storing computer-readable instructions that are executable by a processor of an image recording apparatus, the image recording apparatus comprising a conveyor configured to convey an image recording medium in a conveyance direction, and an image recording engine configured to record an image on the image recording medium, the instructions being configured to, when executed by the processor, cause the image recording apparatus to:
- determine whether a medium length of the image recording medium in the conveyance direction is equal to or less than a particular length;
- in response to determining that the medium length is equal to or less than the particular length, perform a first enlargement process to enlarge the image to a size with a first overhang area by which the enlarged image extends beyond an image recording target area, the first overhang area having an overhang width of a first value in an orthogonal direction that is orthogonal to the conveyance direction;

in response to determining that the medium length is not equal to or less than the particular length, perform a second enlargement process to enlarge the image to a size with a second overhang area by which the enlarged image extends beyond the image recording target area, the second overhang area having an overhang width of a second value in the orthogonal direction, the second value being smaller than the first value; and perform an image recording process to control the conveyor and the image recording engine to record, in the image recording target area on the image recording medium, the enlarged image resulting from one of the first enlargement process and the second enlargement process, thereby performing borderless image recording in which there is no margin at a periphery portion of the image recording target area.

9. A method implementable on a controller of an image recording apparatus, the image recording apparatus comprising a conveyor configured to convey an image recording medium in a conveyance direction, and an image recording engine configured to record an image on the image recording medium, the method comprising:

determining whether a medium length of the image recording medium in the conveyance direction is equal to or less than a particular length;

in response to determining that the medium length is equal to or less than the particular length, performing a first enlargement process to enlarge the image to a size with a first overhang area by which the enlarged image extends beyond an image recording target area, the first overhang area having an overhang width of a first value in an orthogonal direction that is orthogonal to the conveyance direction;

in response to determining that the medium length is not equal to or less than the particular length, performing a second enlargement process to enlarge the image to a size with a second overhang area by which the enlarged image extends beyond the image recording target area, the second overhang area having an overhang width of a second value in the orthogonal direction, the second value being smaller than the first value; and performing an image recording process to control the conveyor and the image recording engine to record, in the image recording target area on the image recording medium, the enlarged image resulting from one of the first enlargement process and the second enlargement process, thereby performing borderless image recording in which there is no margin at a periphery portion of the image recording target area.

* * * * *